United States Patent Office 3,558,762
Patented Jan. 26, 1971

3,558,762
PRODUCTION OF SHEETING AND FILM
Ernst Koehnlein and Peter Bauer, Ludwigshafen, and Karl Stange, Hambach, Germany, assignors to Badische Anilin- & Soda-Fabrik Aktiengesellschaft, Ludwigshafen (Rhine), Germany
No Drawing. Filed Mar. 3, 1969, Ser. No. 804,011
Claims priority, application Germany, Mar. 21, 1968,
P 17 78 014.2
Int. Cl. B29d 23/04
U.S. Cl. 264—209                              5 Claims

ABSTRACT OF THE DISCLOSURE

A process for the production of sheeting or film wherein a mixture is prepared from (a) a polyisobutylene, (b) an ethylene polymer, (c) a filler, (d) a carbon black and (e) a slip additive at elevated temperature and this mixture, while still hot, is supplied to an extruder and shaped into tubular sheeting and film at elevated temperature.

---

The present invention relates to a process for the production of sheeting and film in which (a) a polyisobutylene, (b) an ethylene polymer, (c) a filler, (d) a carbon black and (e) a slip additive are mixed together and the mixture is shaped into sheeting or film by means of an extruder.

Methods of this type are known in a number of variants. The prior art methods have the disadvantage that they give sheeting or film which leaves something to be desired as regards its mechanical properties. This is true especially of the tear resistance and creep rupture strength.

It is an object of the present invention to provide a process of the abovementioned type which does not have the abovementioned disadvantages or has them to a much smaller degree.

We have found that this object can be achieved by choosing specific amounts and types of component and specific process conditions.

The present invention accordingly consists in a process for the production of sheeting and film which comprises preparing a mixture of (a) a polyisobutylene, (b) an ethylene polymer, (c) a filler, (d) a carbon black and (e) a slip additive and shaping the mixture into sheeting or film by means of an extruder. The process according to this invention comprises homogenously mixing together (a) 100 parts by weight of a polyisobutylene, (b) 20 to 50 parts by weight of an ethylene polymer, (c) 200 to 250 parts by weight of a chalk, (d) 25 to 35 parts by weight of a carbon black, and (e) 2 to 8 parts by weight of a slip additive at a temperature of from 170° to 200° C., supplying the mixture obtained, while still hot, to an extruder provided with a circular die and shaping it therein into tubular sheeting or film, the extruder being a three-zone screw extruder having a compression ratio of from 1:1.2 to 1:2.0 and the temperature of the material being from 160° to 180° C. at the inlet to the extruder and 190° to 210° C. in the circular die.

The following details are given concerning the substances to be used in the process according to this invention:

(a) Conventional polyisobutylenes are suitable. Polyisobutylenes having an intrinsic viscosity of 7 to 13 dl./g. (measured in cyclohexane at 30° C.) are particularly suitable.

(b) Conventional ethylene polymers are suitable. Polymers having a melt index MFI 190/2 of from 0.2 to 2 (measured according to DIN 53,735) and a density of 0.917 to 0.960 g./dl. are particularly suitable. Ethylene homopolymers are preferred but copolymers containing minor amounts (less than 50% by weight) of other copolymerizable monomers, particularly copolymers with vinyl esters (such as vinyl acetate and vinyl propionate) and/or esters of acrylic or methacrylic acid (such as ethyl, butyl and isobutyl acrylates and methacrylates) may also be used.

(c) Conventional types of chalk are suitable. Ground chalk having a particle size of from $10^{-4}$ to $10^{-2}$ mm. is particularly suitable.

(d) Conventional carbon blacks are suitable.

(e) Conventional slip additives are suitable. Examples of particularly suitable slip additives are stearic acid, calcium stearate and zinc stearate.

Equipment to be used for the process according to this invention is well known so that no further details need be given here. It should be stated however that it is generally advantageous to carry out the homogeneous mixing of the components (a) to (e) in a Banbury kneader. The hot mixture obtained in batches should if possible not be exposed to any shear forces prior to continuous processing by means of extruders (i.e. should not, as is usually done, be kept hot for example on rollers until required for further processing) but simply stored, for example in a hot cabinet or insulated cabinet.

Sheeting or film obtained by the process according to this invention is particularly suitable for use as sealing sheets or films in the building industry.

The invention is illustrated by the following example. The parts specified in the example are by weight.

EXAMPLE (a) 100 parts of polyisobutylene (intrinsic viscosity 10.2 dl./g., measured in a cyclohexane solution at 30° C.)

(b) 30 parts of ethylene polymer (ethylene homopolymer, melt index MFI 190/2=1.5, density 0.918 g./cm.$^3$)

(c) 238 parts of chalk (particle size from 0.1 to 10 microns)

(d) 28 parts of HAF carbon black (mean particle size 30 millimicrons) and (e) 4 parts of calcium stearate are homogeneously mixed with one another at a temperature of 190° C. by means of a Banbury kneader. The mixture obtained in batches is kept in a heated cabinet (170° C.) and thence supplied continuously at the same temperature to an extruder whose screw has a diameter of 90 mm. and a length/diameter ratio of 20:1. The extruder has a three-zone screw having a compression ratio of 1:1.5 and a circular die (diameter 320 mm., gap width 1.5 mm.). The mixture is shaped into tubular sheeting in this extruder at a temperature of the mixture at the intake of 170° C. and in the annular die of 210° C.

After the sheeting has been cooled to room temperature, the following values are measured:

| | Parallel to the direction of extrusion | Perpendicular to the direction of extrusion |
|---|---|---|
| Tear resistance in kp./cm.$^2$ (DIN 53,455) | 67 | 61 |
| Elongation at break, percent | 500 | 550 |

We claim:

1. A process for the production of sheeting or film which comprises homogeneously mixing together at a temperature of from 170° to 200° C.
   (a) 100 parts by weight of a polyisobutylene
   (b) 20 to 50 parts by weight of an ethylene polymer
   (c) 200 to 250 parts by weight of a chalk
   (d) 25 to 35 parts by weight of a carbon black and
   (e) 2 to 8 parts by weight of a slip additive, supplying the mixture obtained, while still hot, to an extruder provided with a circular die and shaping it therein into tubular sheeting or film, the extruder having a three-zone screw having a compression ratio of from 1:1.2 to 1:2.0 and the temperature of the mixture being from 160° to 180° C. at the inlet to the extruder and from 190° to 210° C. in the circular die.

2. A process as claimed in claim 1 wherein component (a) is a polyisobutylene having an intrinsic viscosity of 7 to 13 dl./g. measured in cyclohexane at 30° C.

3. A process as claimed in claim 1 wherein component (b) is an ethylene polymer having a melt index MFI 190/2 of from 0.2 to 2 (measured according to DIN 53,735) and a density of from 0.917 to 0.960 g./dl.

4. A process as claimed in claim 1 wherein component (c) is a chalk having a particle size of from $10^{-4}$ to $10^{-2}$ mm.

5. A process as claimed in claim 1 wherein component (e) is stearic acid, calcium stearate or zinc stearate.

References Cited

UNITED STATES PATENTS

| | | | |
|---|---|---|---|
| 3,206,419 | 9/1965 | Pritchard et al. | 260—23H |
| 3,278,471 | 10/1966 | Rairdon | 260—897A |
| 3,362,924 | 1/1968 | Eastman | 260—23H |
| 3,386,929 | 6/1968 | Brunel | 260—23H |
| 3,482,033 | 12/1969 | Kenney et al. | 264—211 |

ROBERT F. WHITE, Primary Examiner

G. AUVILLE, Assistant Examiner

U.S. Cl. X.R.

260—23, 897; 264—211